United States Patent
Wang

(10) Patent No.: US 7,848,034 B2
(45) Date of Patent: Dec. 7, 2010

(54) FLAT SPRING PLATE AND LENS ACTUATOR WITH SAME

(75) Inventor: Yu-Bin Wang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 11 days.

(21) Appl. No.: 12/342,240

(22) Filed: Dec. 23, 2008

(65) Prior Publication Data

US 2010/0014176 A1    Jan. 21, 2010

(30) Foreign Application Priority Data

Jul. 15, 2008    (CN) .................. 2008 1 0302742

(51) Int. Cl.
*G02B 7/02* (2006.01)
(52) U.S. Cl. ..................................... 359/819
(58) Field of Classification Search ............... 359/814, 359/819, 824, 827
See application file for complete search history.

(56) References Cited

U.S. PATENT DOCUMENTS 7,400,463 B1 * 7/2008 Wu ............................ 359/824

* cited by examiner

*Primary Examiner*—Alicia M Harrington
(74) *Attorney, Agent, or Firm*—Clifford O. Chi

(57) ABSTRACT

A flat spring plate includes an outer closed-loop frame having a plurality of evenly spaced outer connection parts and a plurality of elongated side frame members each interconnected between the two corresponding adjacent outer connection parts, an inner closed-loop frame concentric with and surrounded by the outer frame, and a plurality of spring parts interconnected between the respective outer connection parts of the outer frame and the respective inner connection parts of the inner frame. The inner frame includes a plurality of evenly spaced inner connection parts. Each of the spring parts includes a U-shaped part adjacent to the corresponding outer connection part, a curved part adjacent to the corresponding inner connection part, and an elongated intermediate part interconnected between the U-shaped part and the curved part. Each elongated intermediate part is substantially parallel to the corresponding side frame member of the outer frame.

17 Claims, 4 Drawing Sheets

FLAT SPRING PLATE AND LENS ACTUATOR WITH SAME

CROSS REFERENCE TO RELATED APPLICATION

This application is related to a commonly-assigned co-pending application Ser. No. 12/192376, entitled "resilient plate and lens actuator with same". Disclosure of the above-identified application is incorporated herein by reference in its entirety.

BACKGROUND

1. Technical Field

The present disclosure relates to lens actuators, and particularly, to a voice coil motor type lens actuator and a flat spring plate in the actuator.

2. Description of Related Art

Variable focal length lenses are widely used in optical systems. Optical systems incorporating such lenses can, for example, provide focused images of objects at varying distances without adjusting the distance between the lens and the image plane. Variable focal length lenses can also be used in optical systems that provide varying magnification without change of lenses.

Generally, the optical system usually includes an actuator, such as a step motor, to drive the lenses. However, the step motor is relatively large in volume. Use of the step motor requires a significant amount of space for movement of the lenses, which makes the optical system bulky.

Therefore, what is needed is a lens actuator adapted for driving the lenses with more compact structure and less mechanical movement.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Figure 1:
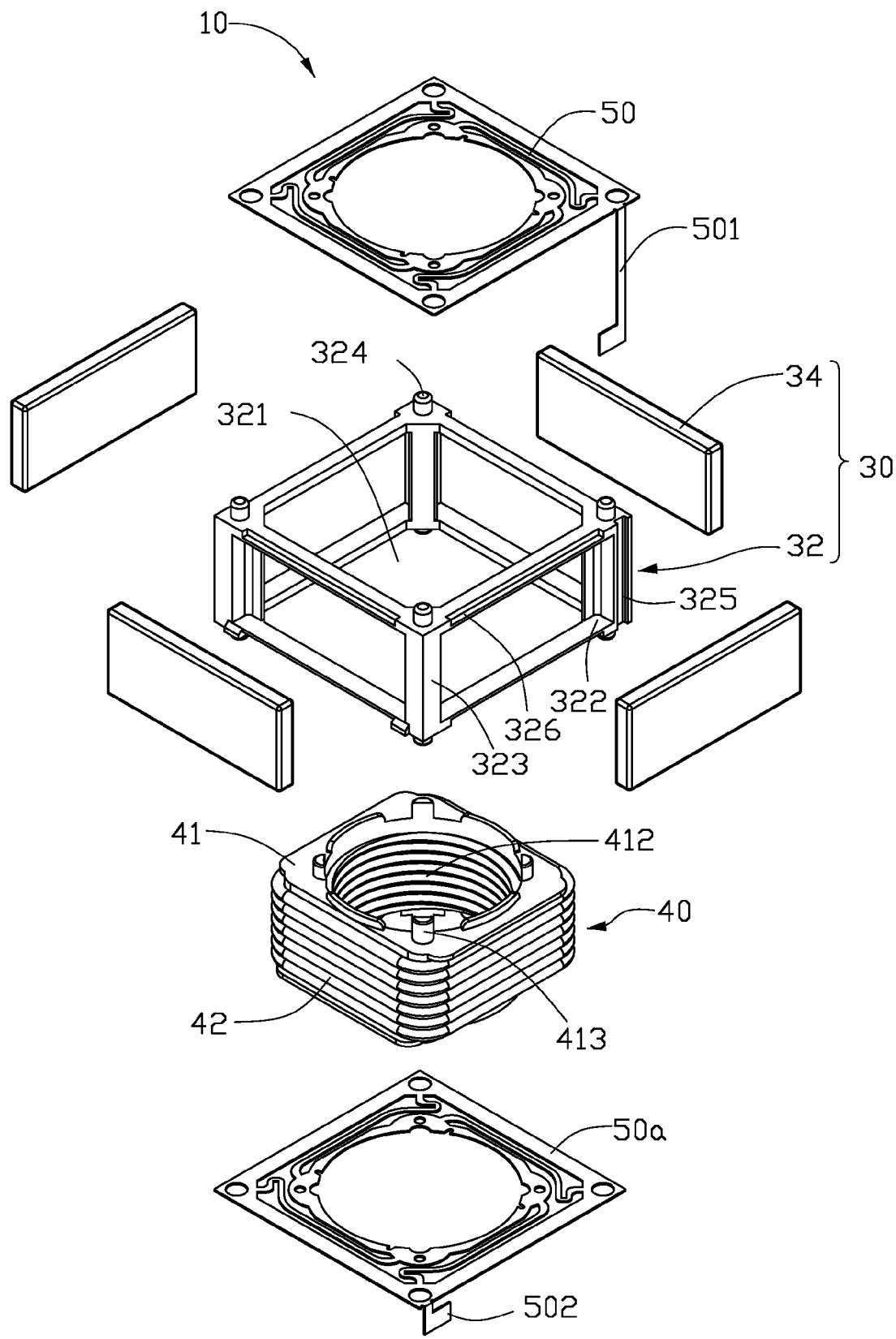
FIG. 1 is an exploded view of the lens actuator according to a first embodiment, the lens actuator including a flat spring plate.

Referring to FIGS. 1, a lens actuator 10, in accordance with a first embodiment, includes a fixed unit 30, a movable unit 40, and two flat spring plates (50, 50a).

The fixed unit 30 includes a cubic bracket 32 and a plurality of magnets 34. The bracket 32 includes a frame body 323. A first accommodation room 321 is defined in the frame body 323. Four magnet mounting holes 322 are respectively formed in four sides of the frame body 323. The magnet mounting holes 322 are configured for receiving the magnets 34 and are in communication with the first accommodation room 321. Four first locating pins 324 are respectively vertically protruded from the top and bottom sides of the frame body 21 at each corner thereof. The first locating pins 324 are configured for locating and fastening the fixed unit 30 to one of the flat spring plates (50, 50a) by receiving an amount of the adhesive. A terminal groove 325 is formed on one side of the frame body 323. A plurality of first gluing grooves 326 is defined in the frame body 323. The first gluing grooves 326 are configured for receiving adhesive for adhering the flat spring plates (50, 50a) to the opposite ends of bracket 32. The number of the magnets 34 corresponds to that of the magnet mounting holes 322. The magnets 34 are respectively mounted in the magnet mounting holes 322.

The movable unit 40 includes a lens barrel 41 and coils 42. The movable unit 40 is accommodated in the first accommodating room 301 and may be movable relative to the fixed unit 30. A second accommodating room 412 is defined in the lens barrel 41. The second accommodating room 412 is configured for accommodating lenses and filters (not shown). The second accommodating room 412 is a through hole. Four second locating pin 413 are respectively vertically protruded from the top and bottom sides of the lens barrel 41 at each corner thereof. The second locating pins 413 are configured for locating and fastening the lens barrel 41 to one of the flat spring plates (50, 50a). The coils 42 are wrapped around the outer wall of the lens barrel 41.

Figure 2:
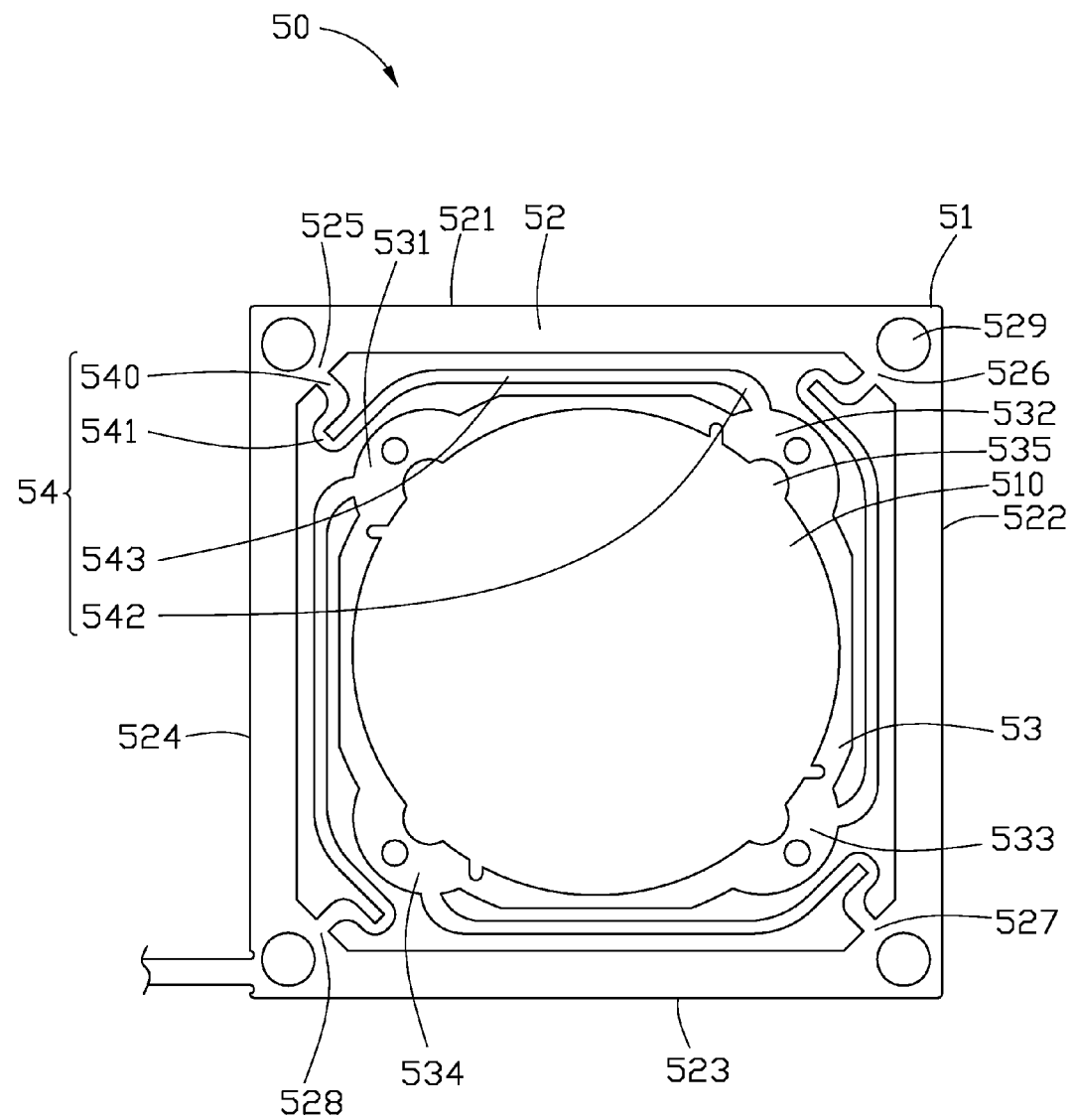
FIG. 2 is a top view of the flat spring plate in FIG. 1.

Referring to FIG. 2, the first flat spring plate 50 comprises a body 51. In the present embodiment, the body 51 is square shaped. A through hole 510 for light passing therethrough is defined in the center of the body 51. The body 51 includes an outer closed-loop frame 52, an inner closed-loop frame 53 concentric with surrounded by the outer closed-loop frame 52, and a plurality of spring parts 54 interconnected between the outer frame 52 and the inner frame 53.

The outer frame 52 includes a plurality of evenly spaced outer connection parts (525, 526, 527, 528) and a plurality of elongated side frame members (521, 522, 523, 524) each interconnected between the two corresponding adjacent outer connection parts. A plurality of locating holes 529 corresponding to the respective first locating pins 324 are defined in the outer frame 52. The locating holes 529 are configured for working with the first locating pins 324 to locate and fasten the flat spring plate 50 to the bracket 32 by receiving an amount of adhesive.

The inner frame 53 includes a plurality of evenly spaced inner connection parts (531, 532, 533,534). The inner frame 53 also defines a plurality of cutouts 535 corresponding to the respective second pins 413. The cutouts 535 are configured for working with the second pins 413 to locate and fasten the first flat spring plate 50 and the lens barrel 41 by receiving an amount of adhesive. Of course, the cutouts 531 may be through holes.

Each spring part 54 is interconnected between the respective outer connection parts (525, 526, 527, 528) of the outer frame 52 and the respective inner connection parts (531, 532, 533, 534) of the inner frame 53 and oriented at approximately right angles to an adjacent spring part. The spring parts 54 cooperate to form a square-shaped pattern framing a central axis of the first flat spring plate 50.

Each spring part 54 includes a connection part 540 connected with the corresponding outer connection part, a U-shaped part 541 interconnected with the connection part 540 and adjacent to the corresponding outer connection part, a curved part 542 adjacent to the corresponding inner connection part, and an elongated intermediate part 543 interconnected between the U-shaped part 541 and the curved part 542.

In this embodiment, the connection part 540 is linear shaped. One leg of each U-shaped part 541 is connected with the connection part 540. The other leg of each U-shaped part 541 is connected with a distal end of the corresponding elongated intermediate part and extends from the distal end in a direction away from the corresponding side frame member of the outer frame 52. Each curved part 542 is connected with a distal end of the corresponding elongated intermediate part and extends from the distal end in a direction away from the corresponding side frame member of the outer frame 52. Each elongated intermediate part 543 is substantially parallel to the corresponding side frame member of the outer frame 52 and intersects a bisecting line bisecting the corresponding side frame member of the outer frame 52.

Most of the structure of the second flat spring plate 50a is similar to that of the first flat spring plate 50, except that, the first flat spring plate 50 includes a first terminal 501 perpendicular to one side thereof and the second flat spring plate 50a includes a second terminal 502 perpendicular to one side thereof.

The first terminal 501 is mounted in the terminal groove 305 of the bracket 32 and electrically connected to the coils 42. The second terminal 502 is electrically connected to the coils 42.

Because each the elongated part 543 of the first flat spring plate 50 is substantially parallel to the corresponding side frame member of the outer frame 52 and intersects a bisecting line bisecting the corresponding side frame member of the outer frame 52, the first flat spring plate 50 is more elastic in the direction of the bisecting line bisecting the corresponding side frame member of the outer frame 52. So, when the lens actuator 10 suffers from a bump along the direction of the bisecting line bisecting the corresponding side frame member of the outer frame 52, the first flat spring plate 50 acts as a buffer to protect the lens actuator 10.

When an electric current is applied to the two terminals (501, 502) and the coils 42, the coils 42 are excited to act upon the magnets 34, thereby receiving a magnetic force to drive the lens barrel 42 to linearly move along its central axis.

When electric current is cut off from the two terminals (501, 502), the first flat spring plate 50 and the second flat spring plate 50a impart a restoring force to the lens barrel 41, thereby returning the lens barrel 41 to its former position.

Figure 3:
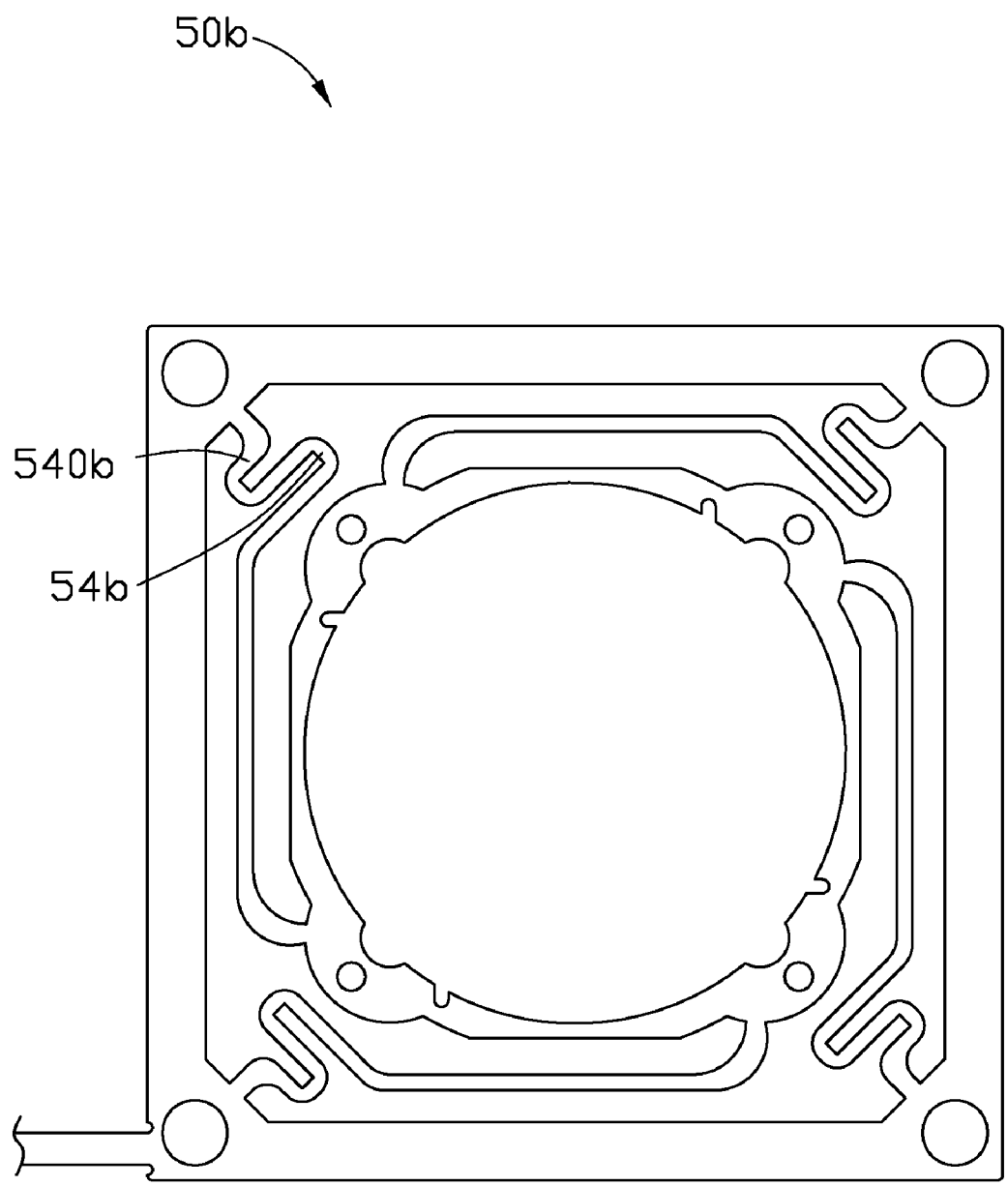
FIG. 3 is a top view of a flat spring plate according to a second embodiment..

Referring to FIG. 3, a flat spring plate 50b, in accordance with a second embodiment, is similar to the flat spring plate 50, except that, the connection part 540b of the spring part 54b is curved shaped.

Figure 4:
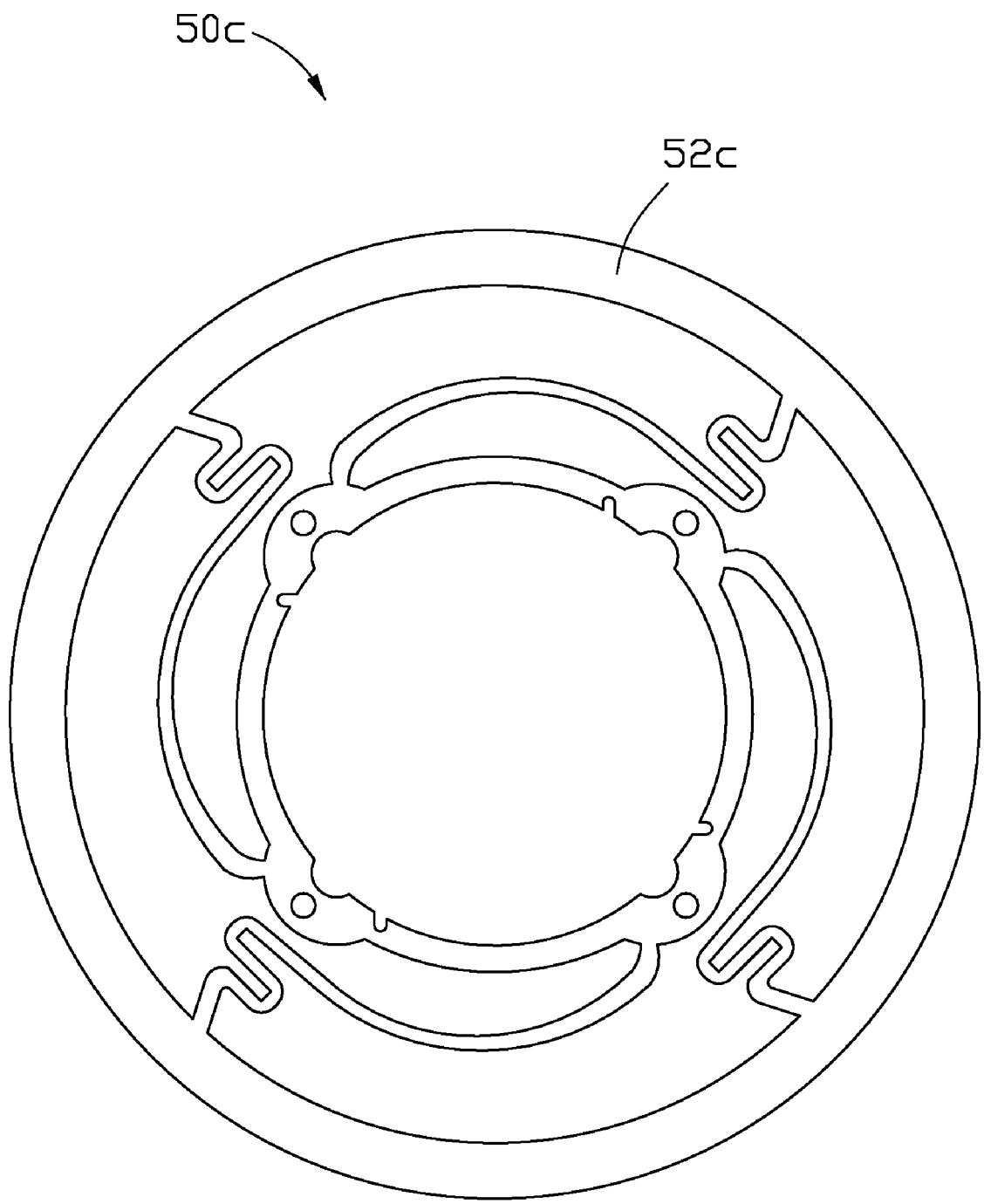
FIG. 4 is a top view of the flat spring plate according to a third embodiment.

Referring to FIGS. 4, a flat spring plate 50c, in accordance with a third embodiment, is similar to the flat spring plate 50b, except that, the outer frame 52c of the flat spring plate 50c is a circle structure.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A flat spring plate, comprising:
    an outer closed-loop frame having a plurality of evenly spaced outer connection parts and a plurality of elongated side frame members each interconnected between the two corresponding adjacent outer connection parts;
    an inner closed-loop frame concentric with and surrounded by the outer frame, the inner frame having a plurality of evenly spaced inner connection parts; and
    a plurality of spring parts interconnected between the respective outer connection parts of the outer frame and the respective inner connection parts of the inner frame,
    wherein each of the spring parts includes a U-shaped part adjacent to the corresponding outer connection part, a curved part adjacent to the corresponding inner connection part, and an elongated intermediate part interconnected between the U-shaped part and the curved part, each elongated intermediate part is substantially parallel to the corresponding side frame member of the outer frame.

2. The flat spring plate as claimed in claim 1, wherein each elongated intermediate part intersects a bisecting line bisecting the corresponding side frame member of the outer frame.

3. The flat spring plate as claimed in claim 2, wherein one leg of each U-shaped part is connected with a distal end of the corresponding elongated intermediate part and extends from the distal end in a direction away from the corresponding side frame member of the outer frame.

4. The flat spring plate as claimed in claim 2, wherein each curved part is connected with a distal end of the corresponding elongated intermediate part and extends from the distal end in a direction away from the corresponding side frame member of the outer frame.

5. The flat spring plate as claimed in claim 1, wherein the spring parts cooperate to form a square-shaped pattern framing a central axis of the flat spring plate.

6. The flat spring plate as claimed in claim 1, wherein the spring parts cooperate to form a round-shaped pattern framing a central axis of the flat spring plate.

7. A flat spring plate, comprising:
    an outer closed-loop frame having a plurality of evenly spaced outer connection parts and a plurality of elongated side frame members each interconnected between the two corresponding adjacent outer connection parts;
    an inner closed-loop frame concentric with and surrounded by the outer frame, the inner frame having a plurality of evenly spaced inner connection parts; and
    a plurality of spring parts interconnected between the respective outer connection parts of the outer frame and the respective inner connection parts of the inner frame,
    wherein each of the spring parts includes a U-shaped part adjacent to the corresponding outer connection part, a curved part adjacent to the corresponding inner connection part, and an elongated intermediate part interconnected between the U-shaped part and the curved part, each elongated intermediate part intersects a bisecting line bisecting a corresponding side frame member of the outer frame, and each elongated intermediate part is substantially parallel to the corresponding side frame member of the outer frame.

8. The flat spring plate as claimed in claim 7, wherein one leg of each U-shaped part is connected with a distal end of the corresponding elongated intermediate part and extends from the distal end in a direction away from the corresponding side frame member of the outer frame.

9. The flat spring plate as claimed in claim 7, wherein each curved part is connected with a distal end of the corresponding elongated intermediate part and extends from the distal end in a direction away from the corresponding side frame member of the outer frame.

10. The flat spring plate as claimed in claim 7, wherein the spring parts cooperate to form a square-shaped pattern framing a central axis of the flat spring plate.

11. The flat spring plate as claimed in claim 7, wherein the spring parts cooperate to form a round pattern framing a central axis of the flat spring plate.

12. A lens actuator for driving a lens to move, comprising:
a lens barrel for accommodating a lens; and
two flat spring plates, each of the flat spring plates including an outer closed-loop frame having a plurality of evenly spaced outer connection parts and a plurality of elongated side frame members each interconnected between the two corresponding adjacent outer connection parts, an inner closed-loop frame concentric with and surrounded by the outer frame, the inner frame having a plurality of evenly spaced inner connection parts, and a plurality of spring parts interconnected between the respective outer connection parts of the outer frame and the respective inner connection parts of the inner frame, the inner closed-loop frames respectively fixed on the opposite ends of the lens barrel,
wherein each of the spring parts includes a U-shaped part adjacent to the corresponding outer connection part, a curved part adjacent to the corresponding inner connection part, and an elongated intermediate part interconnected between the U-shaped part and the curved part, and each elongated intermediate part is substantially parallel to the corresponding side frame member of the outer frame.

13. The lens actuator as claimed in claim 12, wherein each elongated intermediate part intersects a bisecting line bisecting the corresponding side frame member of the outer frame.

14. The lens actuator as claimed in claim 13, wherein one leg of each U-shaped part is connected with a distal end of the corresponding elongated intermediate part and extends from the distal end in a direction away from the corresponding side frame member of the outer frame.

15. The lens actuator as claimed in claim 13, wherein each curved part is connected with a distal end of the corresponding elongated intermediate part and extends from the distal end in a direction away from the corresponding side frame member of the outer frame.

16. The lens actuator as claimed in claim 12, wherein the spring parts cooperate to form a square-shaped pattern framing a central axis of the flat spring plate.

17. The lens actuator as claimed in claim 12, wherein the spring parts cooperate to form a round pattern framing a central axis of the flat spring plate.

* * * * *